(12) United States Patent
Michelau

(10) Patent No.: US 7,722,068 B2
(45) Date of Patent: May 25, 2010

(54) ADJUSTABLE SEAT FOR A CHILDREN'S RIDE-ON VEHICLE

(75) Inventor: Frederick J. Michelau, Des Plaines, IL (US)

(73) Assignee: Radio Flyer Inc., Chicago, IL (US)

( * ) Notice: Subject to any disclaimer, the term of this patent is extended or adjusted under 35 U.S.C. 154(b) by 488 days.

(21) Appl. No.: 11/079,056

(22) Filed: Mar. 14, 2005

(65) Prior Publication Data

US 2005/0206114 A1 Sep. 22, 2005

Related U.S. Application Data

(60) Provisional application No. 60/553,439, filed on Mar. 16, 2004.

(51) Int. Cl.
*B62M 1/00* (2006.01)

(52) U.S. Cl. .................. 280/220; 280/278; 280/287

(58) Field of Classification Search ................. 280/220, 280/278, 287, 288.4; 248/429, 430; 297/344.1, 297/256.1, 344.18, 250.1
See application file for complete search history.

(56) References Cited

U.S. PATENT DOCUMENTS

| | | | |
|---|---|---|---|
| 1,276,203 A | 8/1918 | Fox | |
| 1,675,985 A | 7/1928 | Martin | |
| 1,824,193 A | 9/1931 | Bovingdon | |
| 1,964,405 A | 6/1934 | Nenne | |
| 1,987,431 A | 1/1935 | Browne | |
| 2,019,159 A | 10/1935 | Saunders | |
| 2,514,524 A | 7/1950 | Steele | |
| 2,633,899 A | 4/1953 | Armstrong | |
| 2,723,711 A | 11/1955 | Duncan | |
| 2,827,106 A | 3/1958 | Cramer et al. | |
| 3,027,209 A | 3/1962 | Nielsen | |
| 3,377,966 A * | 4/1968 | Bates et al. ................ | 108/141 |
| 3,711,056 A | 1/1973 | Gmeiner et al. | |
| 3,727,977 A | 4/1973 | Gmeiner | |
| 3,893,400 A | 7/1975 | Grant | |
| 3,915,102 A | 10/1975 | Barron | |
| 4,555,121 A * | 11/1985 | Lockard et al. ............... | 280/30 |
| 4,657,270 A * | 4/1987 | Allen et al. .................. | 280/7.1 |
| 4,772,069 A * | 9/1988 | Szymski ................ | 297/215.14 |
| 4,927,110 A | 5/1990 | Tsumura et al. | |
| 4,958,799 A | 9/1990 | Clauw et al. | |
| 4,968,092 A | 11/1990 | Giambrone | |
| 5,120,074 A * | 6/1992 | Herman et al. ............... | 280/220 |
| 5,499,834 A * | 3/1996 | Pasin et al. ................. | 280/282 |
| 5,513,895 A * | 5/1996 | Olson et al. ............ | 297/215.14 |

(Continued)

*Primary Examiner*—Paul N Dickson
*Assistant Examiner*—Maurice Williams
(74) *Attorney, Agent, or Firm*—DLA PIPER LLP (US); R. Blake Johnston

(57) ABSTRACT

An adjustable seat for a children's ride-on vehicle includes a seat having a pair of tubular brackets mounted thereto. A pair of rails are positioned on the frame of the vehicle and are received within the tubular brackets so that the seat slides on the rails. A series of seat adjustment holes are formed in each rail. Locking rods have distal ends that engage the seat adjustment holes in a removable fashion so that the seat may be selectively locked in position. A locking mechanism is mounted on the seat bottom and features a housing that encloses a compression spring and a pair of squeeze buttons that engage the locking rods and urge them into the seat adjustment holes of the rails.

7 Claims, 6 Drawing Sheets

U.S. PATENT DOCUMENTS

| | | | |
|---|---|---|---|
| 5,599,066 A * | 2/1997 | Chih | 297/383 |
| 5,954,248 A * | 9/1999 | Jasper | 224/155 |
| 6,126,133 A | 10/2000 | Timon et al. | |
| 6,206,394 B1 * | 3/2001 | Olson et al. | 280/244 |
| 6,302,421 B1 * | 10/2001 | Lee | 280/210 |
| 7,232,186 B1 * | 6/2007 | Chi | 297/344.1 |
| 2001/0035626 A1 * | 11/2001 | Kettler | 280/282 |
| 2004/0113474 A1 * | 6/2004 | Lambrecht et al. | 297/344.1 |

* cited by examiner

ADJUSTABLE SEAT FOR A CHILDREN'S RIDE-ON VEHICLE

CLAIM OF PRIORITY

This application claims priority from U.S. Provisional Patent Application Ser. No. 60/553,439, filed Mar. 16, 2004.

BACKGROUND OF THE INVENTION

The present invention relates generally to children's ride-on vehicles and, more particularly, to an adjustable seat for a children's ride-on vehicle.

Ride-on toys are very popular with children and come in a variety of configurations including tricycles, pedal cars and other vehicles. Ride-on toys typically feature either a steering wheel or handlebars by which a child may steer the vehicle. In addition, such toys typically feature pedals to actuate a mechanism by which the child may propel the vehicle.

A child must be positioned an appropriate distance from the steering wheel or handlebars and the pedals in order to efficiently and safely operate a ride-on vehicle. Children in the age group to which ride-on vehicles appeal vary significantly in size. In addition, children of this age group grow quickly from year to year. As a result, it is advantageous to provide ride-on vehicles with adjustable seats.

Prior art ride-on vehicles often feature screws or nuts and bolts that are loosened and tightened to adjust the position of the vehicle seat. Such an arrangement requires the use of tools and may be awkward for an adult, and too difficult for a child, to accomplish. In addition the screws or nuts and bolts could be easily lost. Alternative prior art vehicles use knobs that are loosened to unlock the seat and tightened to lock the seat. Such a knob may be difficult for a child to manipulate.

Accordingly, it is an object of the present invention to provide an adjustable seat for a children's ride-on vehicle that is safe and easy to operate.

It is another object of the present invention to provide an adjustable seat for a children's ride-on vehicle that does not require tools to adjust.

It is another object of the present invention to provide an adjustable seat for a children's ride-on vehicle that securely locks the seat in a selected position.

It is still another object of the present invention to provide an adjustable seat for a children's ride-on vehicle that is economical to manufacture.

These and other objects and advantages will be apparent from the following specification.

SUMMARY OF THE INVENTION

The present invention is directed to an adjustable seat for a children's ride-on vehicle. A seat has a pair of tubular brackets attached thereto. A pair of rails are positioned on the vehicle and are received by the tubular brackets in a sliding fashion. Each of the rails features a series of seat adjustment holes. A pair of locking rods have distal ends received in the seat adjustment holes of the rails in a removable fashion. The tubular brackets feature openings through which the locking rods extend into central passages of the tubular brackets and thus the seat adjustment holes of the pair of rails.

A locking mechanism is attached to the bottom of the seat and engages the locking rods to selectively move their distal ends into and out of the seat adjustment holes of the rails. The locking mechanism includes a housing featuring a pair of open ends. A pair of buttons are received within the open ends of the housing and are connected to the proximal ends of the locking rods. A pair of compression springs are positioned within the housing and engage the buttons to urge them out of the open ends of the housing so that the distal ends of the locking rods are urged into engagement with the seat adjustment holes of the rails.

The following detailed description of embodiments of the invention, taken in conjunction with the accompanying drawings and claims, provide a more complete understanding of the nature and scope of the invention.

DESCRIPTION OF THE PREFERRED EMBODIMENTS

Figure 1:
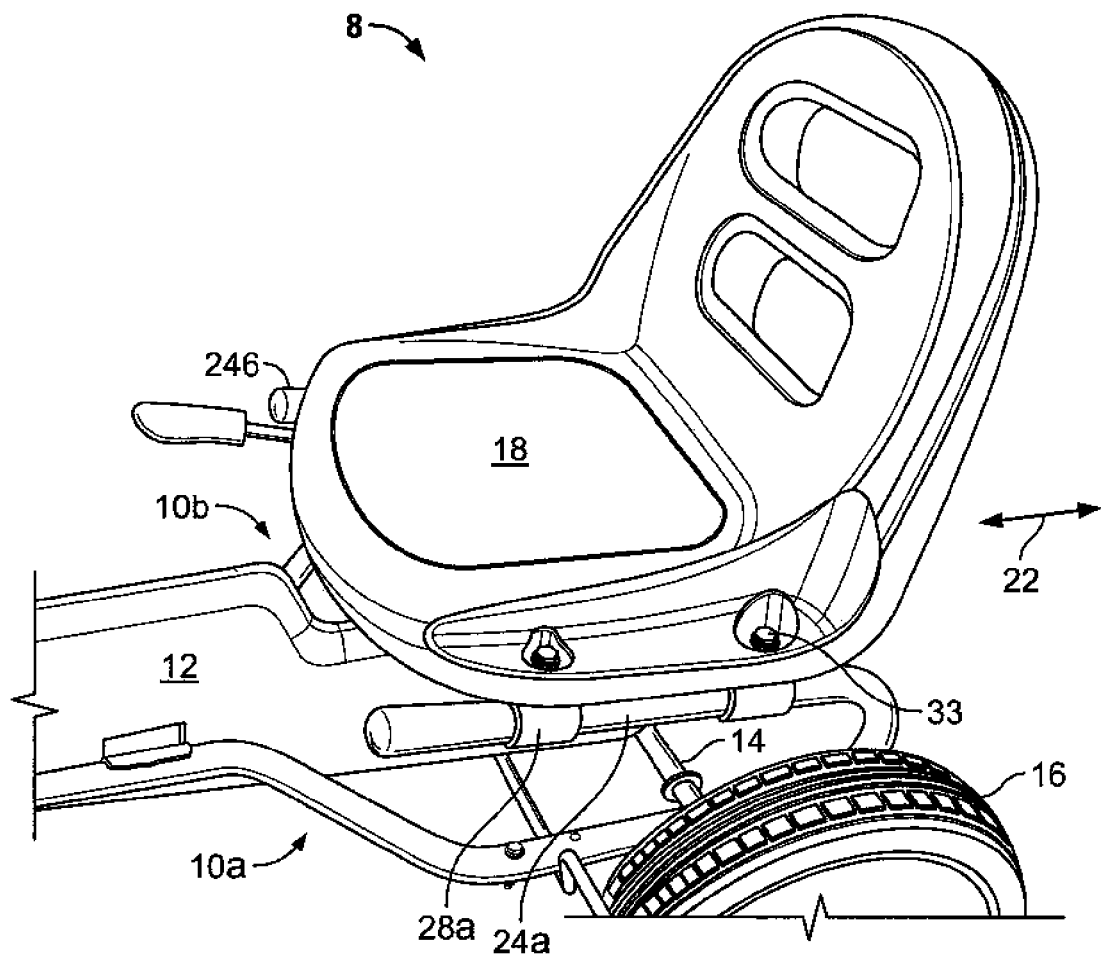
FIG. 1 is a top perspective view of the rear portion a children's ride-on vehicle equipped with an embodiment of the adjustable seat of the present invention.

The rear portion of a children's ride-on vehicle equipped with an embodiment of the adjustable seat of the present invention is indicated in general at 8 in FIG. 1. While the children's ride-on vehicle illustrated at 8 and discussed below is a pedal car, it is to be understood that the invention may be used on virtually any ride-on toy including, but not limited to, tricycles.

The pedal car 8 of FIG. 1 includes a pair of frame members, indicated in general at 10a and 10b, that straddle enclosure 12. While the frame members 10a and 10b are preferably constructed from steel tubing, they may be made of alternative strong and rigid materials and in alternative shapes. Enclosure 12 surrounds the drive chain of the pedal car. As is known in the prior art, the drive chain is mounted on a front sprocket, which is driven by the vehicle pedals, and a rear sprocket, which is mounted upon the rear axle 14 of the pedal car. As a result, the rear wheels 16 of the pedal car are turned by the rear axle 14 when the pedals are actuated by a rider.

As will be explained in greater detail below, a seat 18 is positioned on the frame members 10a and 10b and is capable of being slid forward or backward, as indicated by arrows 22. As a result, the seat position may be adjusted and locked in a configuration where the rider may easily reach the pedals and steering wheel of the pedal car 8. The seat 18 is preferably made of molded plastic, but alternative materials may be used.

Figure 2:
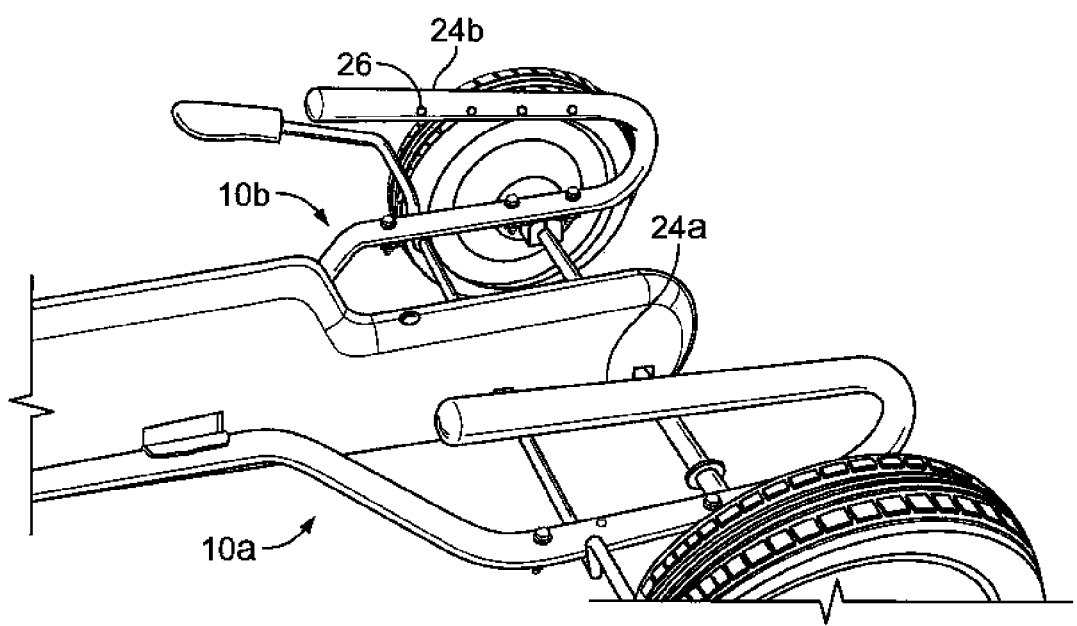
FIG. 2 is a top perspective view of the children's ride-on vehicle of FIG. 1 with the seat removed.

As illustrated in FIG. 2, the frame members 10a and 10b have portions that are curved so that a pair of parallel, horizontal rail portions 24a and 24b are formed. While the embodiment illustrated shows the rails 24a and 24b being portions of the frame members 10a and 10b, the rails may alternatively be separate from the frame members and attached thereto by fasteners or the like. As illustrated for rail 24b, each of the rails has a series of inward-facing seat adjustment holes 26.

Figure 3:
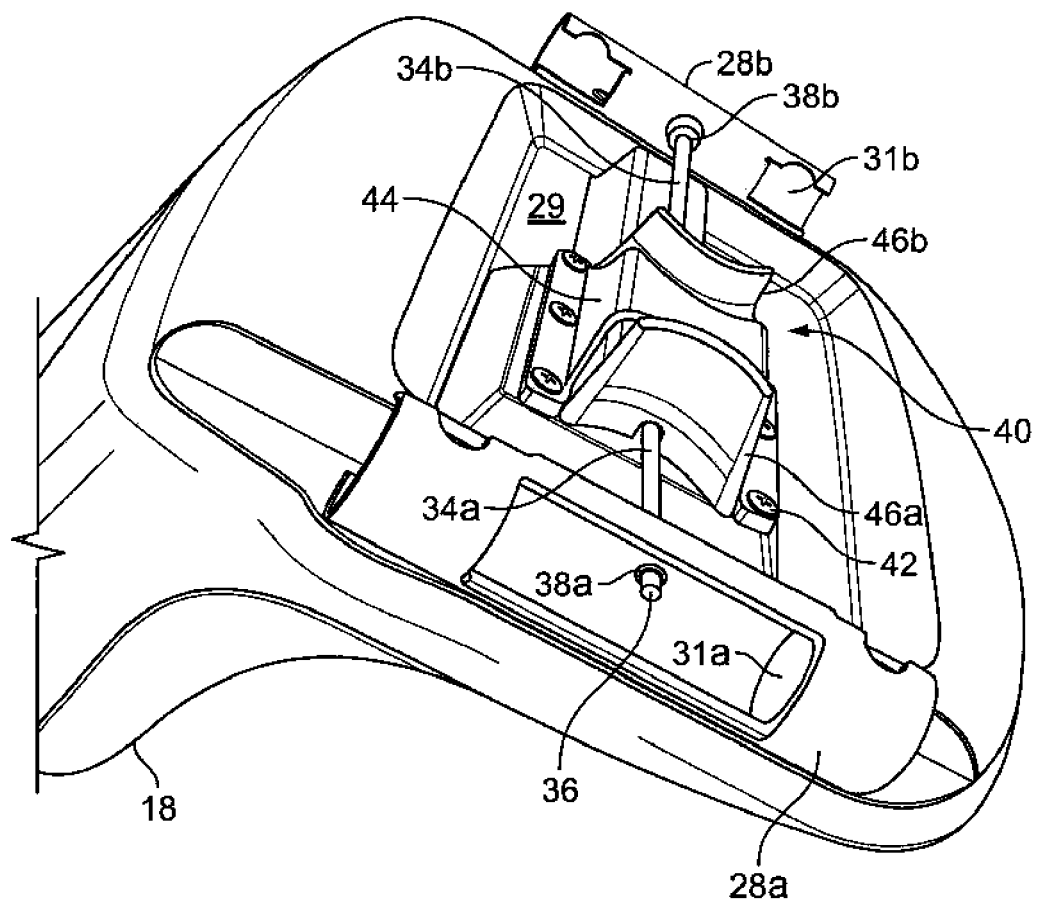
FIG. 3 is a bottom perspective view of the seat of FIG. 1.
Figure 4:
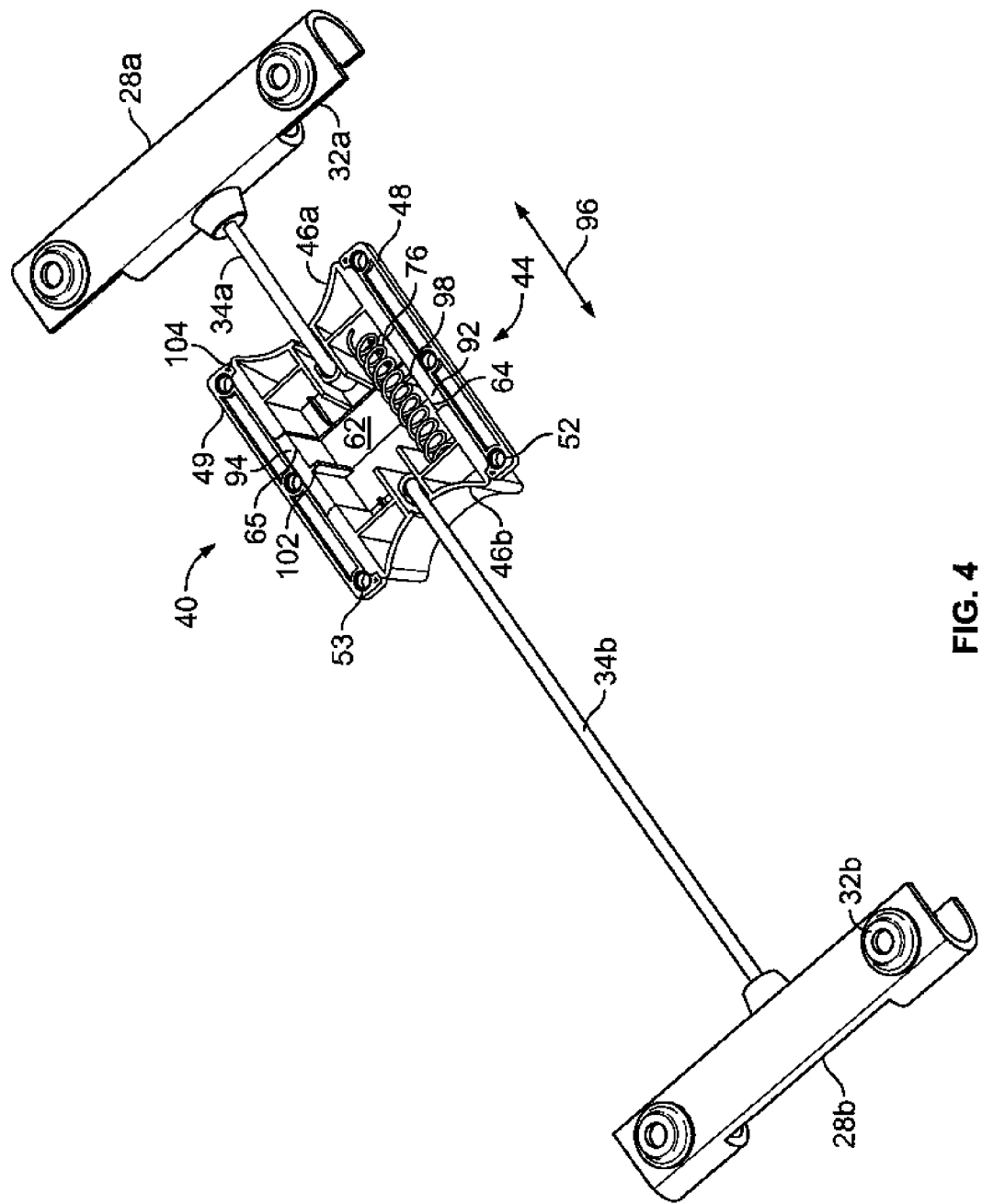
FIG. 4 is a top perspective view of the tubular brackets, locking rods and locking mechanism removed from the seat of FIG. 3.

As illustrated in FIG. 3, a pair of tubular brackets 28a and 28b are mounted to opposite side edges of the underside 29 of the seat 18. The tubular brackets 28a and 28b feature central passages 31a and 31b which are sized so as to receive the rails 24a and 24b of FIG. 2 in a sliding fashion, as illustrated in FIG. 1. As illustrated in FIG. 4, the tubular brackets 28a and 28b feature holes 32a and 32b so that they may be secured to seat 18 by nuts and bolts 33, as illustrated in FIG. 1. Of course, alternative fastening arrangements may be used instead of the nuts and bolts. In addition, the tubular brackets may feature cross-sectional shapes other than round (for example, square, triangular, etc.).

A pair of locking rods, illustrated at 34a and 34b in FIG. 3, have outer or distal ends (illustrated at 36 for locking rod 34a) that extend through openings, illustrated at 38a and 38b, into the central passages 31a and 31b of the tubular brackets in a direction perpendicular to the longitudinal axis of rails 24a and 24b (FIG. 2) and the direction of seat travel. The locking rods are sized so that their distal ends are received within the rail seat adjustment holes 26 of FIG. 2 in a removable fashion.

A locking mechanism, indicated in general at 40 in FIG. 3, is mounted to the bottom of the seat 18 via screws 42. While screws 42 are illustrated, other fastening arrangements may be used. The locking mechanism includes a housing 44 with opposing open ends that receive sliding squeeze buttons 46a and 46b. The inner or proximal end of locking rod 34a is attached to button 46a while the inner or proximal end of locking rod 34b is attached to button 46b.

The tubular brackets 28a and 28b, housing 44 and sliding buttons 46a and 46b are all preferably constructed from plastic, but alternative rigid materials may be used.

The housing 44 of locking mechanism 40, as illustrated in FIG. 4, includes a pair of flanges 48 and 49 through which openings 52 and 53 are formed. The screws 42 of FIG. 3 engage the openings 52 and 53 of FIG. 4 to secure the latching mechanism to the bottom of the seat, as illustrated in FIG. 3. As illustrated in FIG. 4, housing 44 features a bottom wall 62 and opposing sidewalls 64 and 65 that, along with the bottom of the seat 18, define an interior chamber when the housing is installed on the seat bottom, as illustrated in FIG. 3.

As mentioned previously, a pair of squeeze buttons 46a and 46b are received in the open ends of the housing 44. An enlarged view of squeeze button 46a is presented in FIG. 5. Squeeze button 46b features an identical construction. Squeeze button 46a features a pair of pockets 72 and 74. As illustrated in FIG. 4, corresponding pockets in squeeze button 46b cooperate with pockets 72 and 74 so that a pair of compression springs, one of which is illustrated at 76, may be positioned between buttons 46a and 46b and within the interior chamber of housing 44. Only one of the compression springs is illustrated in FIG. 4 for the sake of clarity.

Figure 5:
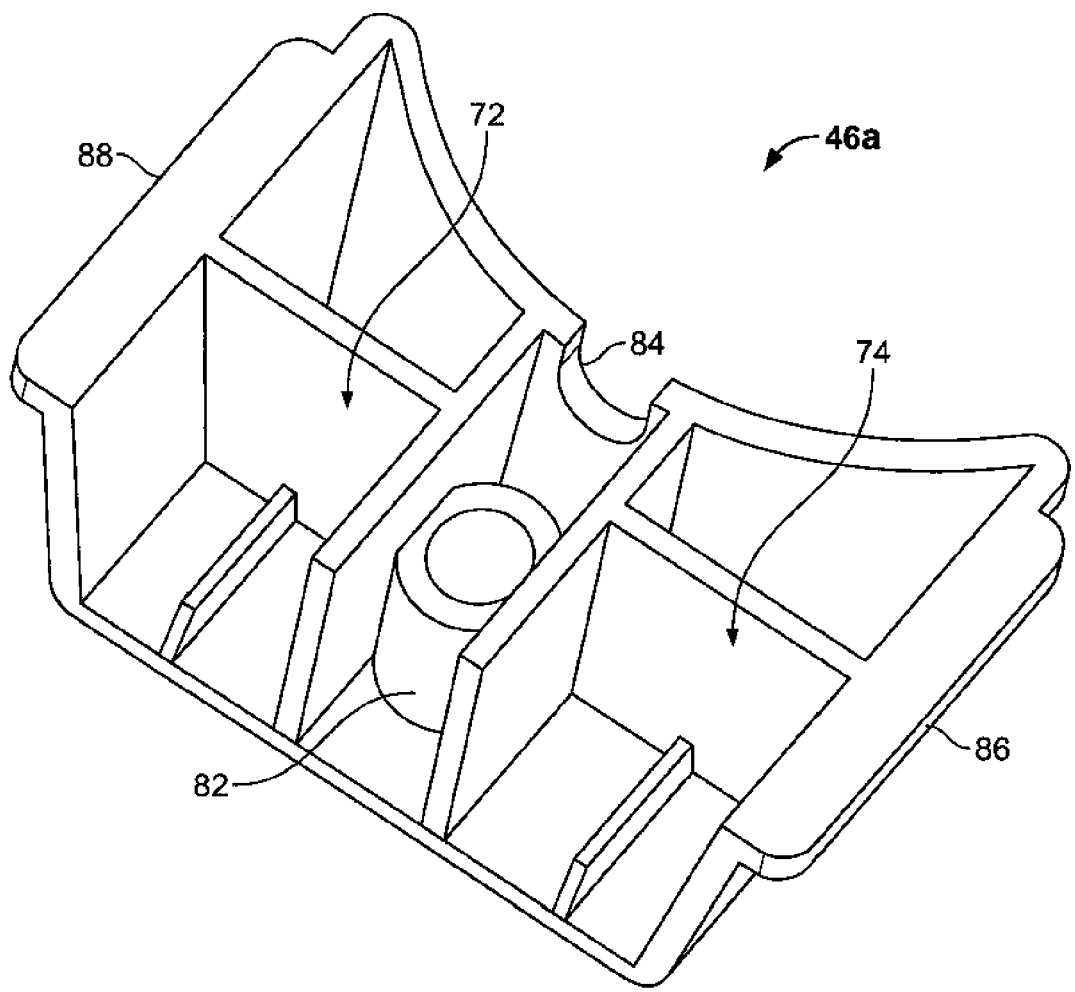
FIG. 5 is an enlarged top perspective view of one of the squeeze buttons of FIG. 4.

As illustrated in FIG. 5, button 46a also features a boss 82 and a semi-circular notch 84. The boss 82 and semi-circular notch 84 receive the proximal end and end portion of rod 34a, respectively, as illustrated in FIG. 4. As a result, rod 34a is secured to the push button 46a. Rod 34b is secured to squeeze button 46b in the same fashion.

Squeeze button 46a also features a pair of tabs, illustrated in FIG. 4 at 86 and 88. As illustrated in FIG. 4, positioned between the flanges 48a and 48b and the sidewalls 64a and 64b of housing 44 are step portions 92 and 94. When housing 44 is attached to the vehicle seat 18, as illustrated in FIG. 3, the step portions 92 and 94 cooperate with the underside of the seat 29 to define channels through which tabs 86 and 88 of FIG. 5 may slide. As a result, squeeze buttons 46a and 46b may slide in the directions illustrated by arrows 96 in FIG. 4.

Housing 44 is provided with centrally-positioned and inward-extending projections, illustrated at 98 and 102 in FIG. 4, that limit the inward travel of the squeeze buttons 46a and 46b. Each end of each step portion 92 and 94 features a protrusion, as illustrated at 104 in FIG. 4. The protrusions engage the ends of tabs 86 and 88 (FIG. 5) to limit travel of the squeeze buttons out of the open ends of housing 44.

As described above with regard to FIG. 1, when the pedal car is assembled, the rail portions 24a and 24b are received within the tubular brackets 28a and 28b of the seat 18. In operation, the compression springs described with respect to FIG. 4 (76) urge the squeeze buttons out of the open ends of the housing, into the position illustrated in FIGS. 3 and 4. In this "locked" configuration, the distal ends 36 of rods 34a and 34b (FIG. 3) are extended so that they enter the seat adjustment holes 26 of rails 24a and 24b (FIG. 2). As a result, the seat is locked into a selected position so that it will not slide backward or forward.

Figure 6:
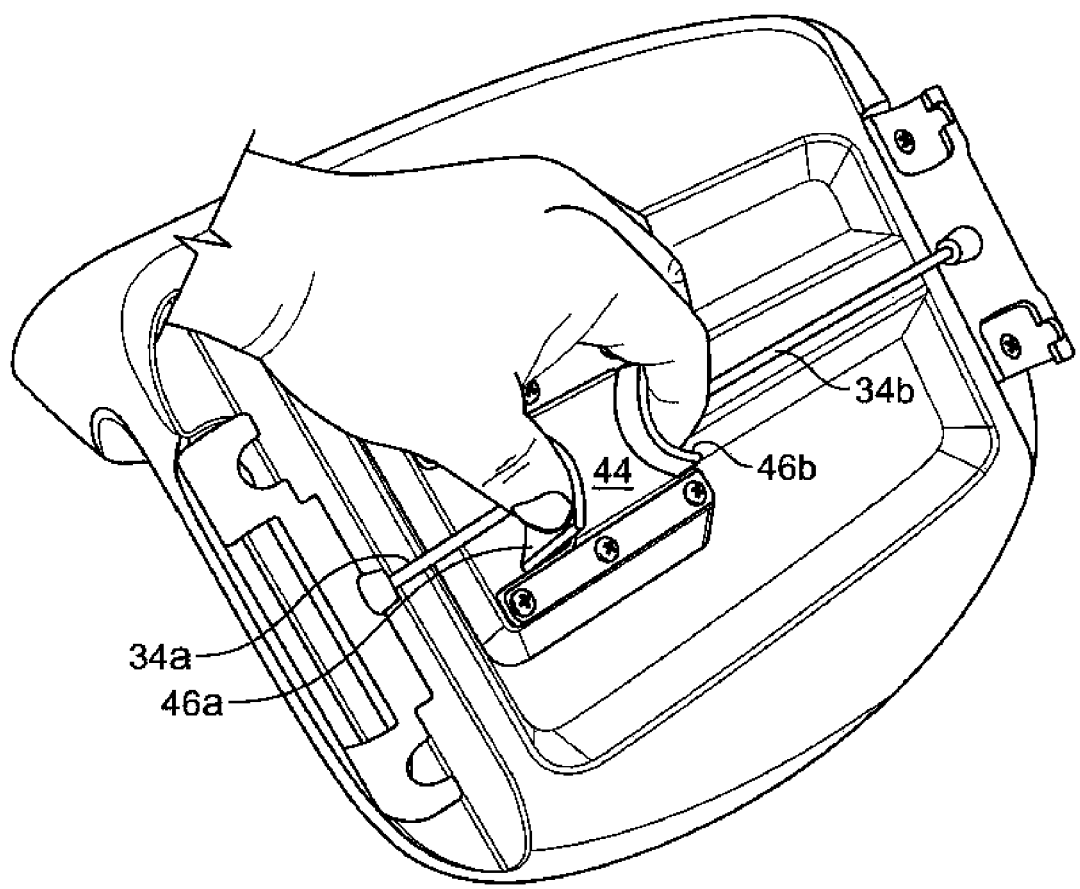
FIG. 6 is a bottom perspective view of the seat of FIGS. 1 and 3 illustrating the locking mechanism being actuated so that the seat is in the unlocked configuration.

When it is desirable to adjust the position of seat 18, the squeeze buttons 46a and 46b are pressed into the housing 44 as illustrated in FIG. 6. This causes the distal ends of rods 34a and 34b to disengage the locking holes of rails 24a and 24b so that the seat may be slid into the desired position. When the desired position is reached, squeeze buttons 46a and 46b are released so that the distal ends of locking rods 34a and 34b, due to the action of the compression springs of FIG. 4, extend into the appropriate locking holes.

The present invention thus provides an adjustable seat for a children's ride-on vehicle that is easy and safe to operate and that securely locks the seat in a desired position. The compression springs of the present invention are enclosed within a housing so that a child cannot pinch his or her fingers in the spring. The present invention also permits the seat to be adjusted without the use of tools. The adjustable seat is also simple to construct and thus economical to produce.

While the preferred embodiments of the invention have been shown and described, it will be apparent to those skilled in the art that changes and modifications may be made therein without departing from the spirit of the invention, the scope of which is defined by the appended claims.

What is claimed is:

1. A children's ride-on vehicle comprising:
   a. a frame with a plurality of wheels rotatably connected thereto;
   b. a rail that is a portion of the frame and that has a plurality of seat adjustment holes, wherein the frame has a curved portion so that the rail is formed by a generally horizontal portion of the frame that is generally parallel to the portion of the frame to which the plurality of wheels are rotatably connected;
   c. a seat;
   d. a bracket attached to the seat and receiving said rail in a sliding fashion;
   e. a locking rod having a distal end removably received in one of the plurality of seat adjustment holes of the rail; and
   f. a locking mechanism attached to the seat and engaging the locking rod to selectively move the distal end of the locking rod into and out of the plurality of seat adjustment holes of the rail, wherein the locking mechanism includes:
      i) a housing having an open end;
      ii) a button received within the housing and connected to a proximal end of the locking rod, said button extending through the open end of the housing;
      iii) a compression spring positioned within the housing and engaging the button to urge it out of the housing so that the distal end of the locking rod is urged into engagement with one of the plurality of seat adjustment holes of the rail; and
      iv) said button retracting into the housing when pressed by a user to remove the distal end of the locking rod from engagement with one of the plurality of seat adjustment holes of the rail.

2. The children's ride-on vehicle of claim 1 wherein the bracket is a tubular bracket having a central passage with the rail slidably positioned therein.

3. The children's ride-on vehicle of claim 2 wherein the tubular bracket features an opening through which the locking rod extends into the central passage of the tubular bracket and the plurality of seat adjustment holes of the rail.

4. The children's ride-on vehicle of claim 1 wherein the button features a pocket that receives an end of the compression spring.

5. The children's ride-on vehicle of claim 1 wherein the vehicle is a pedal car.

6. The children's ride-on vehicle of claim 1 further comprising a pair of tabs extending between the button and the housing, to guide the button as it slides within the housing.

7. The children's ride-on vehicle of claim 6 wherein the button includes the pair of tabs and the housing includes a pair of step portions which receive the pair of tabs of the button in a sliding fashion.

\* \* \* \* \*